Feb. 21, 1928.
W. YOUNG
CONCENTRATOR
Filed April 17, 1926
1,659,935
2 Sheets-Sheet 1
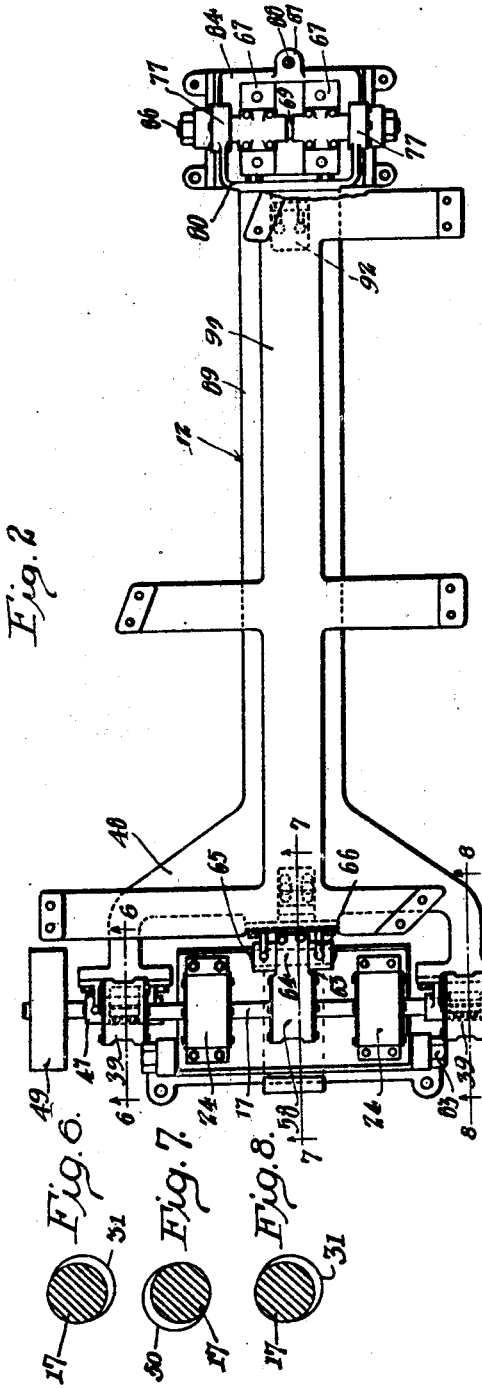
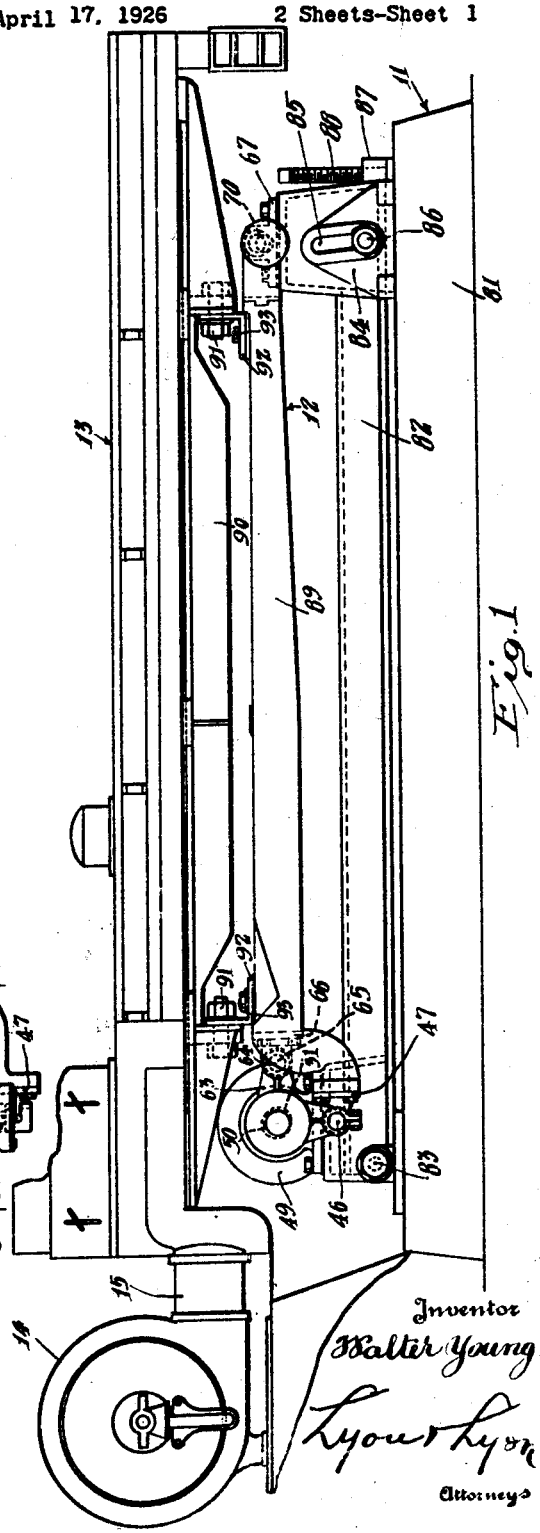
Inventor
Walter Young
Lyon & Lyon
Attorneys Feb. 21, 1928.
W. YOUNG
1,659,935
CONCENTRATOR
Filed April 17, 1926    2 Sheets-Sheet 2
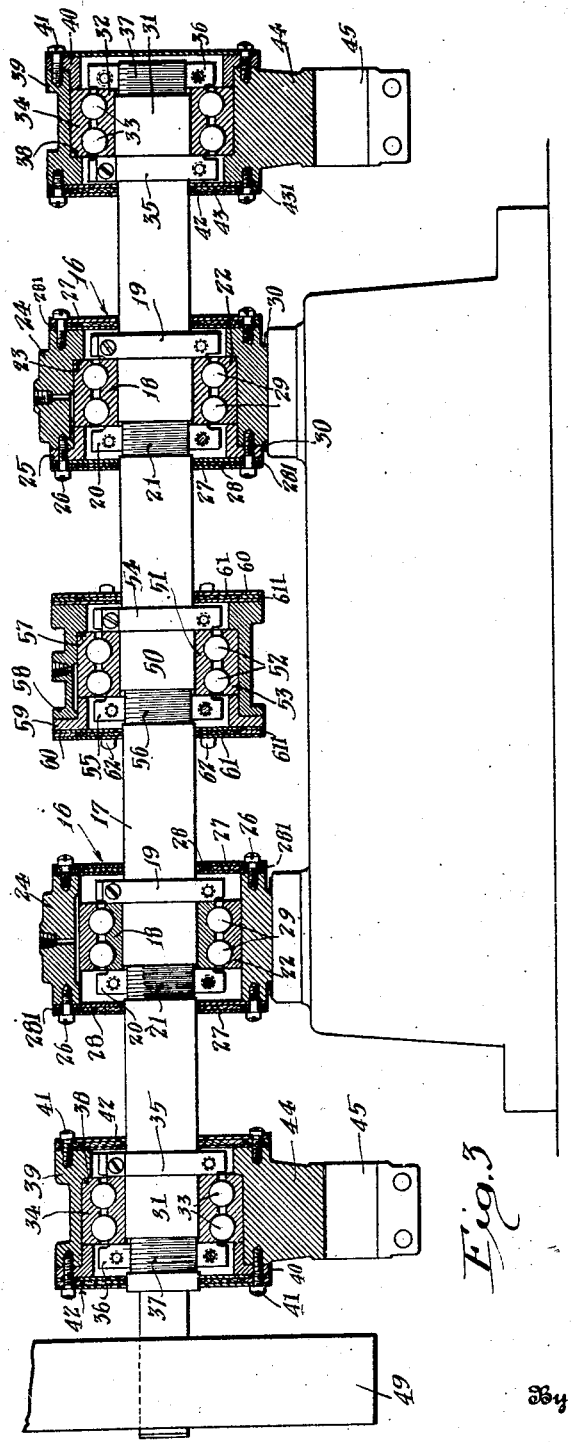
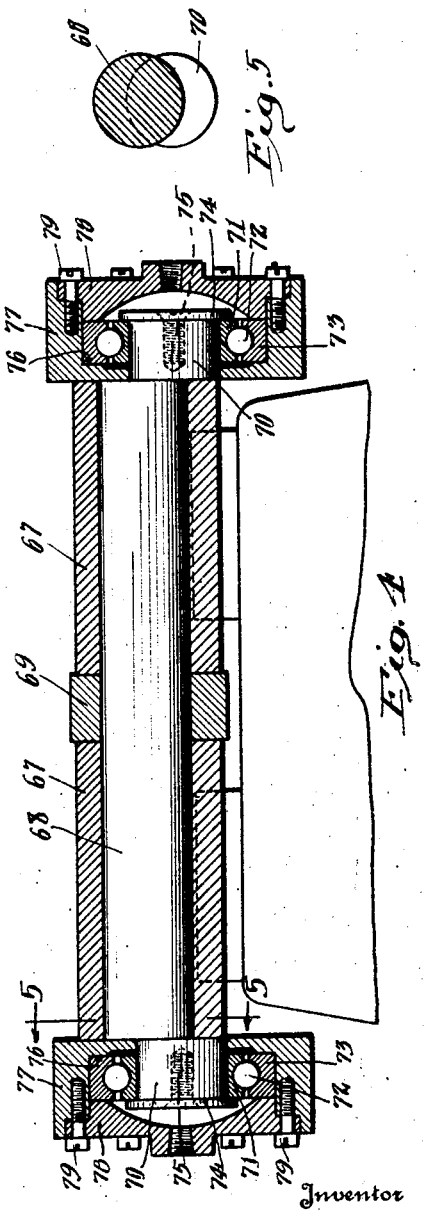
Inventor
Walter Young
By Lyon & Lyon
Attorneys

Patented Feb. 21, 1928.

1,659,935

UNITED STATES PATENT OFFICE.

WALTER YOUNG, OF LOS ANGELES, CALIFORNIA, ASSIGNOR TO MARIE ELSIE YOUNG, OF LOS ANGELES, CALIFORNIA.

CONCENTRATOR.

Application filed April 17, 1926. Serial No. 102,602.

This invention relates to actuating mechanism for dry ore concentrators and more especially to that type of mechanism that operates to vibrate a frame which carries the concentrator table for producing concentration of dry ores.

The invention is an improvement on the concentrator patented to Alva W. Tyler, November 22, 1921, No. 1,397,749, and one of the principal objects of this invention is to simplify the construction whereby the same movements that are obtainable by the patented construction are produced by a much simpler mechanism than disclosed in said patent.

Other objects and advantages will appear in the subjoined detailed description.

The accompanying drawings illustrate the invention:

Figure 1 is a side elevation of a concentrator constructed in accordance with the provisions of this invention, a portion of the table being broken away.

Figure 2 is a plan view of Figure 1 omitting the table and the blower.

Figure 3 is an enlarged view, partly in section, showing the power shaft, base, the bearings for said shaft, and the eccentric connections between said shaft and the shaking frame. The difference in radii between the high and low points of the eccentrics is so slight that it cannot be shown.

Figure 4 is an enlarged view, partly in section, showing the rock shaft, a fragment of the base, the bearings for said shaft, and the eccentric connections between said shaft and the shaking frame.

Figure 5 is a cross section of the rock shaft on the line indicated by 5—5, Figure 4.

Figures 6, 7 and 8 are sectional views on the lines indicated by 6—6, 7—7, 8—8, respectively, Figure 2, showing the eccentrics to an exaggerated degree.

There is provided a suitable base 11, a shaking frame 12 movably mounted on said base, a table 13 mounted on the shaking frame, and a blower 14 connected by a conduit 15 to the table 13. The specific construction of the table 13 will not be described herein, as it may be of any suitable construction such, for example, as that disclosed in the above identified patent, the invention lying more particularly in the mechanism by which the desired movements of the table 13 are effected.

Mounted near one end of the base 11 are anti-friction bearings 16 in which rotates a power shaft 17. Each bearing 16 is constructed as follows:

Fixed to the shaft 17 is an annular race member 18 which is held against movement in one direction by a split collar 19, clamped on the shaft 17. The race member 18 is held against movement in the opposite direction by a split collar 20 which is screwed onto a threaded porton 21 of the shaft. The outer race member of the bearing is indicated at 22 and seats at one end against an internal annular shoulder 23 in a bearing housing 24 and against the opposite end of the race member 22 seats a detachable ring section 25 of the housing 24, which section is secured in place by screws 26. The ends of the housing 24, in this instance, are formed by a plurality of plates 27 having therebetween a packing ring 28 of suitable packing materail, the screws 26 passing through the plates 27 and through said packing ring 28. Thus each of the bearing housings 24 is designed to hold a lubricant. Between the race members 18, 22 are balls 29. Each housing 24 is supported on the upper face of the base 11, being secured thereto by bolts 30.

Near its ends, the shaft 17 is provided with eccentrics 31 on which are mounted inner ball race members 32 for balls 33. Engaging said balls are outer race members 34. Each member 32 is held against movement in one direction by a split collar 35 that is clamped on the shaft 17 and each member 32 is held against movement in the opposite direction by a split collar 36, that is screwed onto a threaded portion 37 of the shaft. One end of the member 34 seats against an internal annular shoulder 38 in a housing 39, and against the other end of said race member 34 seats a detachable section 40 of the housing 39, said section being held in place by screws 41. The ends of the housing 39 are each formed of a plurality of spaced plates 42, separated by a packing ring 43, the screws 41 passing through the plates 42 and through the ring 43. Between the plates 42 and the shaft 17 are clearance spaces as shown in Figure 3.

Each eccentric housing 39 is provided with a downwardly projecting arm 44, the lower portion of which forms a split bearing 45 for a pin 46 that is carried by a furcated bracket 47 and each of the brackets 47 constitutes a detachable section of a forked portion 48 of the frame 12. The bearings 16 are interposed between the eccentrics 31.

When the power shaft 17 is rotated, it causes up and down motion of the forked end of the frame 12, said shaft being provided with a pulley 49 that is driven from any suitable prime mover, not shown.

The shaft 17 is provided between the bearings 16 with an eccentric 50, on which is mounted an inner ball race member 51 for balls 52, which engage an outer race member 53. The member 51 is held against movement in one direction by a split collar 54, clamped on the shaft 17, and said member 51 is held against movement in the opposite direction by a split collar 55, screwed onto a threaded portion 56 of the shaft. One end of the member 53 seats against an internal annular shoulder 57 of a housing 58 and against the other end of said member 53, seats a detachable annular section 59 of the housing 58. The ends of the housing 58 are each formed by a plurality of spaced plates 60, a packing ring 61 being interposed between each pair of said plates. Between the plates 60 and the shaft 17 are clearance spaces as indicated in Figure 3. Screws 62 pass through the plates 60 and ring 61 into the housing 58 and the bolts 62 at one end also pass through the housing section 59.

The housing 58 is provided with a horizontal arm 63, the outer end of which forms a bearing 64 and engages a pin 65 carried by a furcated bracket 66 which constitutes a detachable portion of the frame 12, said bracket 66 being substantially midway between the brackets 47. When the shaft 17 turns, it produces endwise motion of the frame 12 and table 13.

Near the opposite end of the base 11, said base is provided with a pair of spaced bearings 67 for a rock shaft 68, a collar 69 on the shaft 68 being interposed between the adjacent ends of the bearings 67. The opposite ends of the shaft 68 are provided with eccentrics 70 on which are fixed inner ball race members 71 for balls 72, which are engaged by an outer ball race 73. Each race member 71 is held on the eccentric 70 by a washer 74 secured by a screw 75 to the end face of the eccentric 70. One end of each member 73 seats against an internal annular shoulder 76 of a housing 77 and the other end of said member 73 is engaged by a detachable end section or head 78 of the housing 77, said head 78 being secured in place by screws 79. The housings 77 are on the extremities of a forked portion 80 of the frame 12, said forked portion 80 being at the opposite end of the frame 12 from the forked portion 48. It will thus be seen that when the frame 12 is moved endwise, the forked portion 80 will move in an arc about the axis of the rock shaft 68, thus the forked portion 80 will be given a relatively slight up and down motion, but the endwise motion will be as great as that imparted to the forked portion 48 by the eccentrics 31.

The base 11 is preferably formed in two parts, a sub-base member 81 and an upper adjustably mounted base member 82. The base member 82 is hinged at 83 to the base member 81, the hinge 83 being positioned at that end of the base adjacent to the power shaft 17, and the other end of the base member 81 is provided with slotted standards 84, the slots being indicated at 85, and extending through said slots 85 are bolts 86 which project from the base portion 82. The base member 82 is provided with a lug 87 through which is screwed a vertical adjusting screw 88 having its outer end engaging the upper face of the base member 81. When it is desired to adjust the tilt of the table 13 longitudinally, the bolts 86 will be loosened and the screw 88 turned by a suitable wrench. After the desired adjustment has been made, the bolts 86 will be tightened.

The foregoing will make clear the construction and operation of the invention and the operation may be described briefly, as follows: Power being applied to operate the blower 14 and to turn the shaft 17, and the dry ore to be treated in the concentrator being supplied to the table 13, in a manner well understood in this art, the eccentrics 31 will produce up and down motion of the left end of the table 13 in Figure 1 and the eccentric 50 will operate to produce endwise motion or reciprocation of the table 13. By positioning the eccentric 50 ninety degrees of circular measurement from the eccentrics 31, the left end of the table in Figure 1 may be caused to move in an elliptical path. The method described in the above mentioned patent may be performed with this concentrator, said method consisting in causing the ore to move away from a reciprocating supporting surface for an interval of time while the surface is moving in one direction so as to eliminate friction between the ore and the surface causing movement thereof, and said method also consisting in delivering a current of air beneath the ore-supporting surface while the ore moves up and down so as to cause decreased air pressure beneath the ore when the ore moves up, and to cause increased air pressure beneath the ore when the ore falls toward the supporting surface. Furthermore, said method consists in imparting alternative forward and backward motions to the ore and overcoming in part, the backward motion of the particles by the aid of gravity while the particles are free from the impelling surface and, furthermore, said method consists also in directing a current of air upward beneath the particles to further aid in overcoming the backward motion of the particles.

The housings 39, 58, 77 constitute eccentric straps for the respective eccentrics 31, 50, 70. It is desirable to provide for adjusting the tilt of the table transversely and for this reason the frame 12, in this instance, is made in sections, a lower section 89 and an upper section 90. The lower section 89 carries the brackets 47 and eccentric straps 77 and the section 90 is tiltably mounted on the section 89 by hinge joints comprising bolts 91 and angle brackets 92 secured by bolts 93 on the upper face of the lower section 89.

I claim:

1. Actuating mechanism for a dry ore concentrator, comprising a base, a shaft mounted to turn on said base, a frame having a forked portion at one end terminating in brackets, the frame having a bracket between the first mentioned brackets, eccentric connections between the first mentioned brackets and shaft, an eccentric connection between the second mentioned bracket and shaft, and means movably connecting the other end of the frame to the base.

2. Actuating mechanism for a dry ore concentrator, comprising a base, a shaft mounted to turn on said base, a frame having a forked portion at one end, eccentrics on the shaft, eccentric straps operated by the eccentrics, two of said straps having downwardly projecting arms movably connected with the terminals of the forked portion, another of said straps having a horizontally projecting arm movably connected with the frame between the fork portions, and means movably connecting the other end of the frame to the base.

3. Actuating mechanism for a dry ore concentrator, comprising a base, a shaft mounted to turn on the base and provided at intervals with threaded portions, split collars threaded onto the threaded portions, other collars clamped on the shaft, eccentrics on the shaft between the first and second mentioned collars, an inner ball race member on each eccentric, outer ball race members, balls between said race members, eccentric straps surrounding the outer race members and provided with arms, said arms having bearings at their outer ends, a frame provided at one end with pins engaging in said bearings, and means movably connecting the other end of the frame to the base.

4. Actuating mechanism for a dry ore concentrator, comprising a base, spaced bearings on said base, a shaft in said bearings provided with an eccentric between the bearings and with other eccentrics, the bearings positioned between the first and second mentioned eccentrics, a shaking frame provided with a forked portion, an eccentric strap for the first mentioned eccentric provided with a horizontal arm pivoted to the frame between the forks, eccentric straps for the other eccentrics provided with downwardly projecting arms pivoted to the terminals of the forks, and means movably connecting the other end of the frame to the base.

5. Actuating mechanism for a dry ore concentrator, comprising a base, spaced bearings on said base, a shaft in said bearings provided with an eccentric between the bearings and with other eccentrics, the bearings positioned between the first and second mentioned eccentrics, a shaking frame provided with a forked portion, an eccentric strap for the first mentioned eccentric provided with a horizontal arm pivoted to the frame between the forks, eccentric straps for the other eccentrics provided with downwardly projecting arms pivoted to the terminals of the forks, and means rockably connecting the other end of the frame to the base.

Signed at Los Angeles, California, this 6th day of April, 1926.

WALTER YOUNG.